UNITED STATES PATENT OFFICE.

ALFRED W. PRATT, OF FLUSHING, NEW YORK, ASSIGNOR OF ONE-HALF TO HENRY S. LAMBERT, OF ORANGE, NEW JERSEY.

LIQUID DRIER FOR OILS.

SPECIFICATION forming part of Reissued Letters Patent No. 10,040, dated February 21, 1882.

Original No. 211,782, dated January 28, 1879. Application for reissue filed November 10, 1880.

*To all whom it may concern:*

Be it known that I, ALFRED W. PRATT, of Flushing, in the county of Queens, in the State of New York, have invented a new and useful Process for Manufacturing a Compound to be Used as a Drier for Oils, Paints, &c., which is fully set forth in the following specification.

My invention consists of a process for the production of a manganese-soap to be used as a drier for oils, paints, &c., as follows: I take linseed or other suitable oil and add to it a solution of caustic soda, or other caustic alkali, sufficient to saponify the oil. This mixture I boil together in a kettle or other receptacle until the mass becomes viscid. I then take chloride of manganese, or other soluble salt of manganese, dissolve it in water, and add to the soapy mass as much of this solution of the chloride of manganese as the soapy mass will absorb to produce a manganese-soap by the reaction between the manganese salt and the soap produced by the action of the caustic alkali on the oil. I then cleanse this manganese-soap by washing it with water, the effect of which is to remove the alkaline salt produced in the reaction of the soap and manganese. I then add rosin or other resinous substances and simmer the whole mass in a suitable receptacle over a fire until the entire mass becomes homogeneous.

I obtain the best results by taking ten pounds of caustic soda, dissolve it in water to produce a strong lye, to which I add seven and a half gallons of oil, (linseed preferred,) and boil that mixture together in a kettle to form a soap. I then add ten gallons of aqueous solution of manganese, or soluble salt of manganese, and wash out the solution of soda salt which is liberated by the double decomposition of the salt of manganese on the soda-soap, and add thereto thirty-four pounds of rosin, or other suitable resinous substances, and simmer the whole mass over a fire until it becomes entirely homogeneous.

A drier will be produced by omitting the rosin or other resinous substances, but not so good as when used.

I prefer using the chloride of manganese such as produced as a residuum in the ordinary method of manufacturing chlorine gas by means of black oxide of manganese. I do not, however, confine myself to these exact proportions, as various changes may be made without departing from the spirit of my invention.

I prefer, and the best results are obtained by, using linseed-oil; but any other suitable oils may be used, and instead of rosin, other suitable resinous substances. To thin this manganese-soap I use linseed-oil, or turpentine and naphtha may be substituted for a part of the oil for that purpose.

What I claim is—

1. The within-described process of producing a manganese-soap by treating oil with caustic soda, or its equivalent, and then with a solution of chloride of manganese, or its equivalent.

2. The within-described process of producing a manganese-soap by treating oil with caustic soda, or its equivalent, and then with chloride of manganese, or its equivalent, and adding thereto rosin or other resinous substances.

ALFRED W. PRATT.

Witnesses:
JOHN BIGELOW,
JOHN R. BENNETT.